(12) United States Patent
Choi et al.

(10) Patent No.: US 8,012,617 B2
(45) Date of Patent: Sep. 6, 2011

(54) SECONDARY BATTERY HAVING SEALING PORTION OF NOVEL STRUCTURE

(75) Inventors: Sang-Kyu Choi, Daejeon (KR);
Kwangho Yoo, Daejeon (KR);
Hyunwoo Park, Daejeon (KR);
Eunyoung Oh, Daejeon (KR);
Youngjoo Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/747,744

(22) PCT Filed: Dec. 4, 2008

(86) PCT No.: PCT/KR2008/007174
§ 371 (c)(1),
(2), (4) Date: Jan. 11, 2011

(87) PCT Pub. No.: WO2009/078604
PCT Pub. Date: Jun. 25, 2009

(65) Prior Publication Data
US 2011/0104527 A1    May 5, 2011

(30) Foreign Application Priority Data

Dec. 14, 2007  (KR) .......................... 10-2007-0131599

(51) Int. Cl.
*H01M 2/12* (2006.01)

(52) U.S. Cl. .......................................... 429/56; 429/53
(58) Field of Classification Search .................... 429/53, 429/56
See application file for complete search history.

(56) References Cited

U.S. PATENT DOCUMENTS

| | | | |
|---|---|---|---|
| 7,511,456 B2 | 3/2009 | Lee et al. | |
| 2005/0158622 A1* | 7/2005 | Mizuta et al. | 429/185 |
| 2008/0124614 A1 | 5/2008 | Cheon et al. | |
| 2008/0233468 A1* | 9/2008 | Otohata et al. | 429/53 |

FOREIGN PATENT DOCUMENTS

| | | |
|---|---|---|
| JP | 2000-18722 A | 1/2000 |
| JP | 2005-116235 A | 4/2005 |
| JP | 2006-185713 A | 7/2006 |
| KR | 10-2003-0035185 A | 5/2003 |
| KR | 10-049714 B1 | 6/2005 |

(Continued)

*Primary Examiner* — Robert Hodge
(74) *Attorney, Agent, or Firm* — Birch, Stewart, Kolasch & Birch, LLP

(57) ABSTRACT

Disclosed herein is a plate-shaped secondary battery constructed in a structure in which an electrode assembly of a cathode/separator/anode structure is mounted in a battery case, and the battery case is sealed by thermal welding, wherein the battery case is provided at a sealing portion around an electrode assembly receiving part thereof with an exhaust guide sealing portion configured in a structure in which a width of the exhaust guide sealing portion decreases from an inside of the sealing portion toward an outside of the sealing portion such that a sealing force of the exhaust guide sealing portion is first released, when high-pressure gas is generated in a battery cell, and therefore, the high-pressure gas is exhausted outside, the exhaust guide sealing portion being thermally welded with a sealing force less than that of a sealing portion located at a remaining region ('a remaining sealing portion'), and the battery case is further provided at a middle of the exhaust guide sealing portion with a bridge sealing portion extending in parallel to the electrode assembly for interconnecting opposite sides of the remaining sealing portion with a predetermined width, the bridge sealing portion being thermally welded with a sealing force greater than that of the exhaust guide sealing portion.

13 Claims, 4 Drawing Sheets

FOREIGN PATENT DOCUMENTS

| KR | 10-0515571 | B1 | 9/2005 |
| KR | 10-0515572 | B1 | 9/2005 |
| KR | 10-2006-0112035 | A | 10/2006 |
| KR | 10-2006-0116424 | A | 11/2006 |
| KR | 10-2006-0131320 | A | 12/2006 |
| KR | 10-0889765 | B1 | 3/2009 |

* cited by examiner

US 8,012,617 B2

SECONDARY BATTERY HAVING SEALING PORTION OF NOVEL STRUCTURE

FIELD OF THE INVENTION

The present invention relates to a secondary battery having a novel-structured sealing portion, and, more particularly, to a secondary battery including an exhaust guide sealing portion formed at a sealing portion of a battery case in a structure in which the width of the exhaust guide sealing portion decreases from the inside of the sealing portion toward the outside of the sealing portion, the exhaust guide sealing portion exhibiting a low sealing force, and a bridge sealing portion formed at the exhaust guide sealing portion, the bridge sealing portion exhibiting a relatively high sealing force, to achieve desirable sealability in a normal operating condition and effectively exhaust high-pressure gas in a battery cell through a desired region, thereby preventing a possibility that the battery will catch fire or explode and thus improving the safety and operational reliability of the battery.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and discharge voltage, on which much research has been carried out and which is now commercially and widely used.

Generally, a secondary battery is manufactured by stacking or winding an electrode assembly including a cathode, an anode, and a separator disposed between the cathode and the anode, placing the electrode assembly in a battery case formed of a metal container or a laminate sheet, and injecting an electrolyte into the battery case or impregnating the electrode assembly with the electrolyte.

One of the principal problems to be solved in connection with the secondary battery is to improve the safety of the secondary battery. For example, the secondary battery may explode by high temperature and high pressure which may be induced in the secondary battery due to the abnormal operation of the secondary battery, such as an internal short circuit, overcharge exceeding allowable current and voltage, exposure to high temperature, dropping, or deformation caused by external impact. Particularly for a pouch-shaped secondary battery, the sealing force of a battery case lowers, with the result that an electrolyte may leak from the battery case.

FIG. 1 is an exploded perspective view typically illustrating the general structure of a conventional representative pouch-shaped secondary battery.

Referring to FIG. 1, the pouch-shaped secondary battery 10 includes an electrode assembly 30, pluralities of electrode tabs 40 and 50 extending from the electrode assembly 30, electrode leads 60 and 70 welded to the electrode tabs 40 and 50, respectively, and a battery case 20 for receiving the electrode assembly 30.

The electrode assembly 30 is a power generating element including cathodes and anodes successively stacked while separators are disposed respectively between the cathodes and the anodes. The electrode assembly 30 may be constructed in a stacking structure or a stacking/folding structure. The electrode tabs 40 and 50 extend from corresponding electrode plates of the electrode assembly 30. The electrode leads 60 and 70 are electrically connected to the electrode tabs 40 and 50 extending from the corresponding electrode plates of the electrode assembly 30, respectively, for example, by welding. The electrode leads 60 and 70 are partially exposed to the outside of the battery case 20. To upper and lower surfaces of the electrode leads 60 and 70 are partially attached insulative films 80 for improving sealability between the battery case 20 and the electrode leads 60 and 70 and, at the same time, for securing electrical insulation between the battery case 20 and the electrode leads 60 and 70.

The battery case 20 is formed of an aluminum laminate sheet. The battery case 20 has a space defined therein for receiving the electrode assembly 30. The battery case 20 is formed generally in the shape of a pouch.

The secondary battery 10 is manufactured by thermally welding contact regions at the outer circumference of the battery case 20 while the electrode assembly 30 is mounted in the receiving space of the battery case 20.

When the secondary battery is put in an abnormal operating condition, such as an internal short circuit, overcharge, or exposure to high temperature, an electrolyte in the secondary battery is decomposed, with the result that high-pressure gas is generated. The generated high-pressure gas may deform the battery case and shorten the life span of the secondary battery. Furthermore, the secondary battery may catch fire or explode due to the high-pressure gas. Therefore, it is preferred to separate thermally welded regions from each other, such that gas is exhausted outside through the separated regions, before the pressure of the secondary battery reaches a high-pressure level at which the secondary battery may catch fire or explode. However, when gas noxious to a human body is exhausted outside through an arbitrary region, it is difficult to control the exhaust of the noxious gas.

Therefore, various attempts have been made to prevent the combustion or explosion of a battery, when high-pressure gas is generated, and efficiently exhaust the gas outside.

As an example, Japanese Patent Application Publication No. 2006-185713 discloses a secondary battery constructed in a structure in which upper and lower parts, of which the inner surfaces are made of a flexible, thermoplastic resin, of a battery case are overlapped, and flat portions around a power generating element receiving part are thermally welded, wherein a vertically bent concavo-convex part is partially formed in the thermally welded region.

In the above-described technology, the vertically bent concavo-convex part serves to selectively exhaust high-pressure gas generated from the interior of the battery case through the corresponding region. However, the disclosed secondary battery has a problem in that the thermally welded flat portions around the vertically bent concavo-convex part are minutely deformed by the concavo-convex part, with the result that a sealing force of the secondary battery decreases.

As another example, Japanese Patent Application Publication No. 2005-116235 discloses a technology for forming a specific gas exhaust mechanism in a battery constructed in a structure in which the outer circumferential portions of a laminate film, in which an electrode assembly is mounted, are thermally welded to seal the laminate film. The disclosed technology is to deform the innermost sealing layer of the laminate film such that the innermost sealing layer has an adhesive strength by thermal welding less than that of the remaining region of the laminate film using a method of partially removing a sealing layer or coupling a polymer resin exhibiting a low coupling force to some of the sealing layer.

In the method of partially removing the sealing layer, however, the sealing layer region and the region around the sealing layer are relatively weak. As a result, internal gas may be concentrated on these regions, even under the pressure generated in a state in which the battery normally operates, and therefore, the regions may be easily ruptured. Consequently, it is difficult for the sealing layer to secure sealability. In the method of coupling the polymer resin exhibiting the low coupling force to some of the sealing layer, on the other hand, sealability at the interface between the different polymers may greatly lower due to the difference in material between the polymer resin of the sealing layer and the polymer resin exhibiting the low coupling force.

Although the above-described technologies may exhaust high-pressure gas through the selected region to secure safety, therefore, it is difficult to exhibit reliable sealability in a state in which the battery normally operates.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present application have developed a secondary battery including an exhaust guide sealing portion formed at a sealing portion of a battery case in a structure in which the width of the exhaust guide sealing portion decreases from the inside of the sealing portion toward the outside of the sealing portion, the exhaust guide sealing portion exhibiting a low sealing force, and a bridge sealing portion formed at the exhaust guide sealing portion, the bridge sealing portion exhibiting a relatively high sealing force, and have found that such a secondary battery is capable of achieving desirable sealability in a normal operating condition and effectively exhausting high-pressure gas in a battery cell through a desired region, thereby preventing a possibility that the battery will catch fire or explode and thus improving the safety and operational reliability of the battery.

Specifically, an object of the present invention is to provide a secondary battery having a sealing portion of a specific structure to improve the operational reliability and safety of the secondary battery.

In accordance with one aspect of the present invention, the above and other objects can be accomplished by the provision of a plate-shaped secondary battery constructed in a structure in which an electrode assembly of a cathode/separator/anode structure is mounted in a battery case, and the battery case is sealed by thermal welding, wherein the battery case is provided at a sealing portion around an electrode assembly receiving part thereof with an exhaust guide sealing portion configured in a structure in which a width of the exhaust guide sealing portion decreases from an inside of the sealing portion toward an outside of the sealing portion such that a sealing force of the exhaust guide sealing portion is first released, when high-pressure gas is generated in a battery cell, and therefore, the high-pressure gas is exhausted outside, the exhaust guide sealing portion being thermally welded with a sealing force less than that of a sealing portion located at a remaining region ('a remaining sealing portion'), and the battery case is further provided at a middle of the exhaust guide sealing portion with a bridge sealing portion extending in parallel to the electrode assembly for interconnecting opposite sides of the remaining sealing portion with a predetermined width, the bridge sealing portion being thermally welded with a sealing force greater than that of the exhaust guide sealing portion.

In the secondary battery according to the present invention, therefore, the sealing portion exhibits a desirable sealing force in a normal operating condition of the battery. When high-pressure gas is generated in the battery cell due to an abnormal operating condition of the battery, on the other hand, the exhaust guide sealing portion is ruptured earlier than the remaining region, with the result that the high-pressure gas is exhausted outside through the exhaust guide sealing portion. Consequently, it is possible to exhaust noxious gas to a desired place and to prevent a possibility that the battery will catch fire or explode.

The exhaust guide sealing portion is configured in a structure in which the width of the exhaust guide sealing portion decreases from the inside of the sealing portion toward the outside of the sealing portion such that an expansion stress caused by the high-pressure gas in the battery cell concentrates on the exhaust guide sealing portion. Consequently, when high-pressure gas is generated in the battery cell, the exhaust guide sealing portion is ruptured earlier than the remaining region to exhaust the gas.

The exhaust guide sealing portion may have a relatively small upper-end (outside) width equivalent to 10 to 50% of a relatively large lower-end (inside) width thereof. When the lower-end (inside) width of the exhaust guide sealing portion is too large, the sealing force of the battery in a normal operating condition may decrease. On the other hand, when the lower-end (inside) width of the exhaust guide sealing portion is too small, it is difficult to exhaust the gas to a desired degree. Consequently, the lower-end (inside) width of the exhaust guide sealing portion may be appropriately decided within the above-specified range.

In an exemplary example, the exhaust guide sealing portion may have a lower-end (inside) width equivalent to 5 to 30% of the major-axis length of the battery case.

The shape of the exhaust guide sealing portion is not particularly restricted as long as the exhaust guide sealing portion is configured in a structure in which the width of the exhaust guide sealing portion decreases from the inside of the sealing portion toward the outside of the sealing portion. For example, the exhaust guide sealing portion may be formed in a horizontal plane shape of at least one selected from a group consisting of a semicircle, a triangle, and a trapezoid. Preferably, the exhaust guide sealing portion is formed in the trapezoidal shape.

The bridge sealing portion effectively increases the sealing force of the sealing portion 310, which may be weakened by the formation of the exhaust guide sealing portion. That is, the expansion stress caused by the high-pressure gas in the battery cell concentrates on the exhaust guide sealing portion; however, since the bridge sealing portion is ruptured only by gas pressure at which the exhaust of gas is required, it is possible to reliably secure the operation of the battery.

As previously defined, the bridge sealing portion may exhibit a sealing force greater than that of the exhaust guide sealing portion and equal to, less than, or greater than that of the remaining sealing portion. In an exemplary example, the bridge sealing portion may exhibit a sealing force 30 to 100% greater than that of the exhaust guide sealing portion.

When the width of the bridge sealing portion is too large, the exhaust of high-pressure gas generated in the battery may be disturbed. On the other hand, when the width of the bridge sealing portion is too small, the sealing portion may be easily weakened even by low-pressure gas. Preferably, therefore, the bridge sealing portion has a width equivalent to 10 to 60% of that of the remaining sealing portion.

According to circumstances, the battery case may be further provided at an interface between the exhaust guide sealing portion and the remaining sealing portion with an interface sealing portion thermally welded with a sealing force greater than that of the remaining sealing portion.

The interface sealing portion prevents a possibility that the sealing force of the region around the exhaust guide sealing portion will be weakened by the formation of the exhaust guide sealing portion. Also, when high-pressure gas is generated in the battery, the interface sealing portion prevents the deformation and release in the sealing force of the exhaust guide sealing portion and the remaining sealing portion adjacent to the exhaust guide sealing portion, during the exhaust of gas, thereby guiding the gas to the exhaust guide sealing portion with higher reliability.

In the above-described structure, the width of the interface sealing portion may be changed as needed. For example, the interface sealing portion may have a width equivalent to 2 to 20% of that of the remaining sealing portion.

In an exemplary example, the interface sealing portion may have a sealing force 30 to 150% greater than that of the remaining sealing portion. At this time, the sealing force of the bridge sealing portion may be less than that of the interface sealing portion. According to circumstances, however, the sealing force of the bridge sealing portion may be equal to that of the interface sealing portion.

The location of the exhaust guide sealing portion is not particularly restricted. For example, the location of the exhaust guide sealing portion may be appropriately decided according to a desired gas exhaust route. That is, a predetermined exhaust member may be mounted to the battery cell itself or a pack case to prevent noxious internal gas from being unintentionally exhausted out of the battery cell, and the location of the exhaust guide sealing portion may be decided such that the exhaust guide sealing portion communicates with the exhaust member.

In an exemplary example, the exhaust guide sealing portion may be formed at the middle of each of opposite-side sealing portions located on the minor axis of the battery case on the basis of the middle of the battery case. Here, the middle of the battery case means the intersection between the middle of the major axis and the middle of the minor axis of the battery case and its surrounding region. The middle of the battery case is a region where the gas flowing route is the shortest in the battery, and the expansion in volume of the battery case is the greatest, and therefore, it is possible to rapidly and efficiently achieve the exhaust of gas.

The battery case is preferably applicable to a secondary battery constructed in a structure in which an electrode assembly is mounted in a pouch-shaped case formed of a laminate sheet, particularly an aluminum laminate sheet, including a resin layer and a metal layer.

The laminate sheet includes an outer coating layer formed of polymer film, a barrier layer formed of metal foil, and an inner sealant layer formed of a polyolefin-based material. It is required for the outer coating layer to exhibit excellent resistance to an external environment, and therefore, the outer coating layer must exhibit a predetermined tensile strength and weather resistance. In this aspect, oriented nylon film or polyethylene terephthalate (PET) are preferably used as the polymer resin for the outer coating layer. The barrier layer may be made of, preferably, aluminum to prevent the introduction or leakage of foreign matter, such as gas or moisture and increase the strength of the battery case. The inner sealant layer may be made of, preferably, a polyolefin-based material exhibiting a high thermal welding property (a thermal adhesion property), a low hygroscopic property to restrain the penetration of an electrolyte, and a property which is not expanded or corroded by the electrolyte, more preferably cast polypropylene (cPP).

The structure of the electrode assembly is not particularly restricted so long as the electrode assembly is constructed in a structure in which the electrode assembly includes a cathode, an anode, and a separator disposed between the cathode and the anode. For example, the electrode assembly may be constructed in a folding, stacking, or stacking/folding type structure. The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth therein.

The secondary battery according to the present invention may be, preferably a lithium secondary battery. In particular, the secondary battery according to the present invention is preferably applied to a so-called a lithium ion polymer battery having an electrode assembly impregnated with a lithium-containing electrolyte in the form of a gel.

In accordance with another aspect of the present invention, there is provided a middle- or large-sized battery module including the secondary battery as a unit cell.

In particular, the secondary battery according to the present invention is preferably used in a high-power, large-capacity battery requiring a long-term life span and excellent durability or a middle- or large-sized battery module and a middle- or large-sized battery pack including a plurality of such batteries as unit cells. The middle- or large-sized battery module may be used as a power source for, for example, electric vehicles, hybrid electric vehicles, electric motorcycles, and electric bicycles.

The structures of the middle- or large-sized battery module and the middle- or large-sized battery pack and a method of manufacturing the same are well known in the art to which the present invention pertains, and a detailed description thereof will not be given.

In accordance with a further aspect of the present invention, there is provided a method of manufacturing the secondary battery, the method including mounting the electrode assembly in the receiving part of the battery case and thermally welding the sealing portion at the outer circumference of the battery case on a heating jig formed in an engraved shape corresponding to the exhaust guide sealing portion, the bridge sealing portion, and/or the interface sealing portion and having a depth inversely proportional to sealing forces of the sealing portions.

The thermal welding for forming the sealing portion is achieved by simultaneously heating and pressurizing a portion to be sealed (for example, the outer circumference of the battery case). The sealing force is generally in proportion to a pressurizing force for thermal welding. Consequently, the smaller the engraved depth of heating jig is, the higher the sealing force of the sealing portion corresponding to the heating jig may be.

In the manufacturing method according to the present invention, therefore, it is possible to simultaneously form a desired exhaust guide sealing portion, bridge sealing portion, and interface sealing portion by only the engraved depth. Consequently, the present invention may be applicable to a conventional manufacturing process as long as the heating jig is modified.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
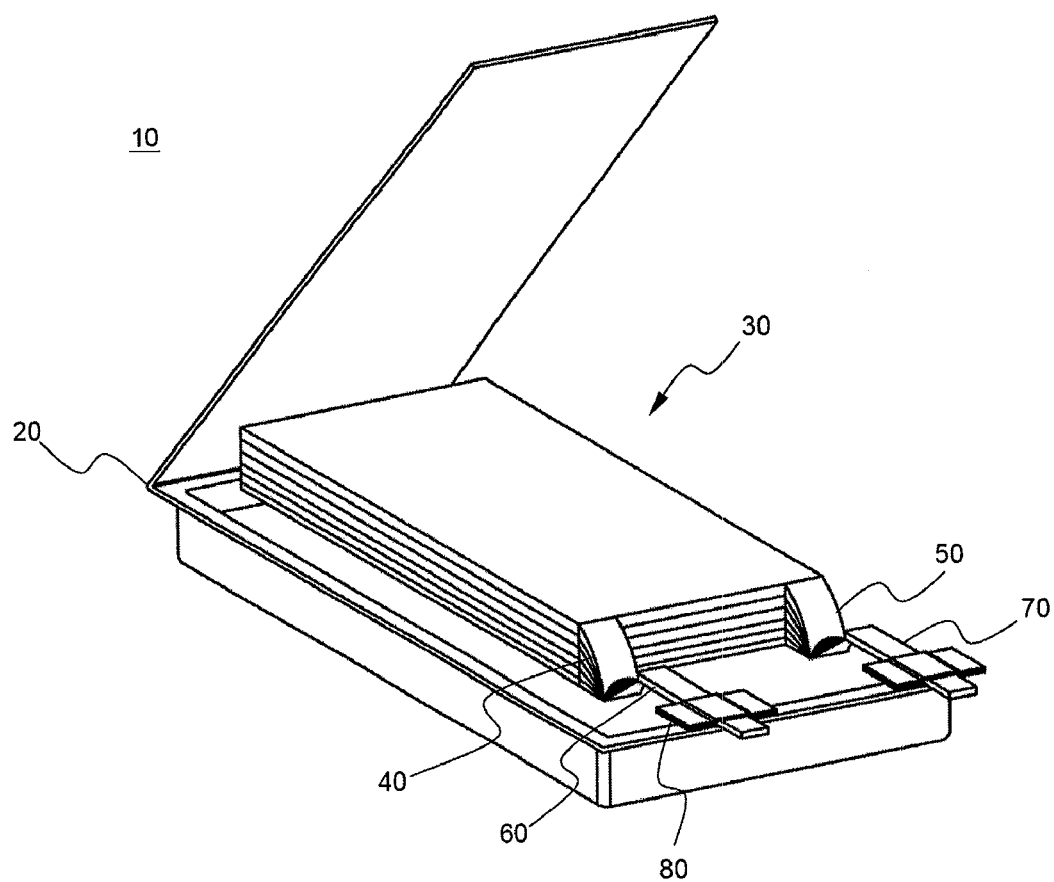
FIG. 1 is an exploded perspective view illustrating the general structure of a conventional pouch-shaped secondary battery.
Figure 2:
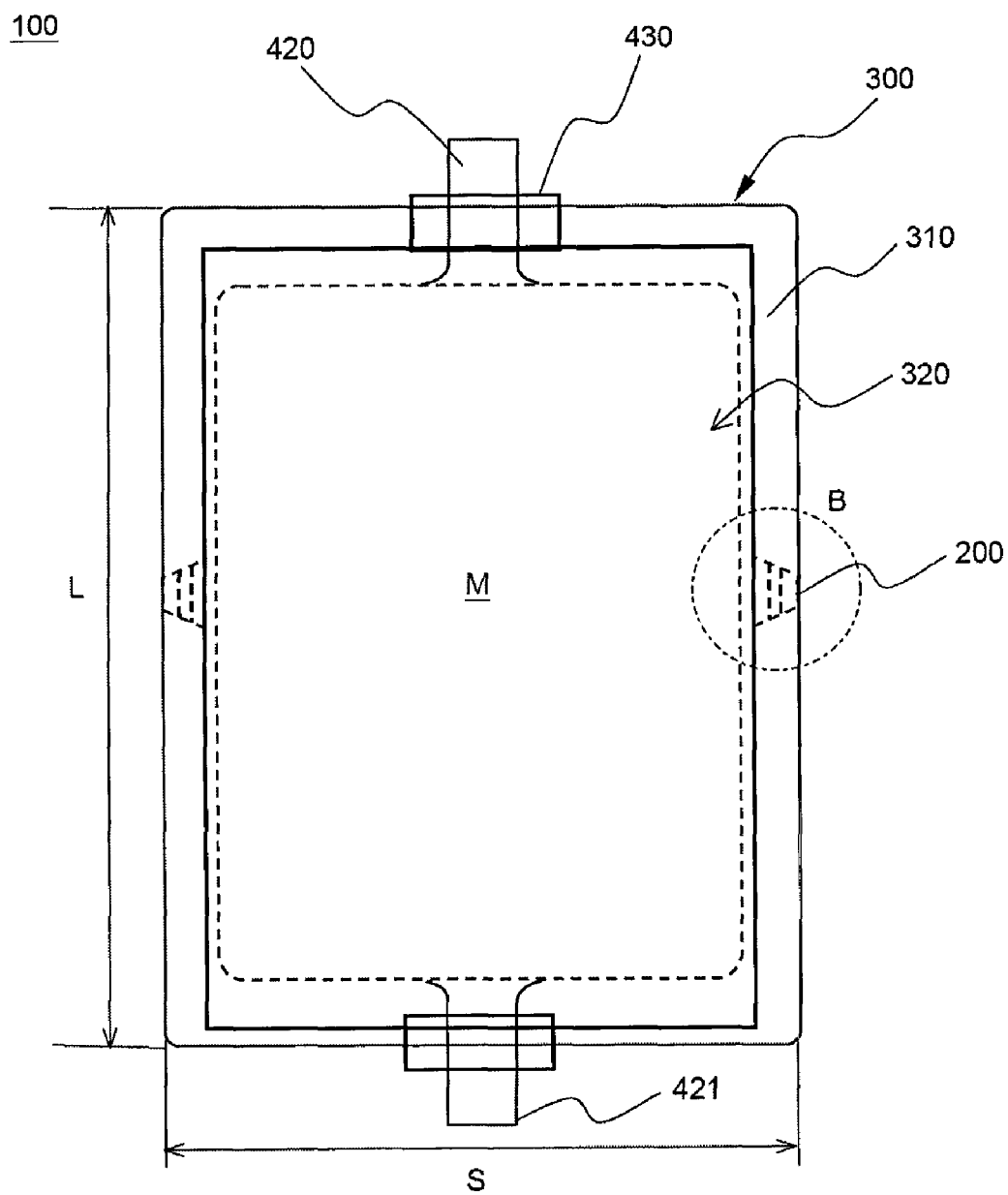
FIG. 2 is a see-through sectional view illustrating a secondary battery having an exhaust guide sealing portion according to an embodiment of the present invention.
Figure 3:
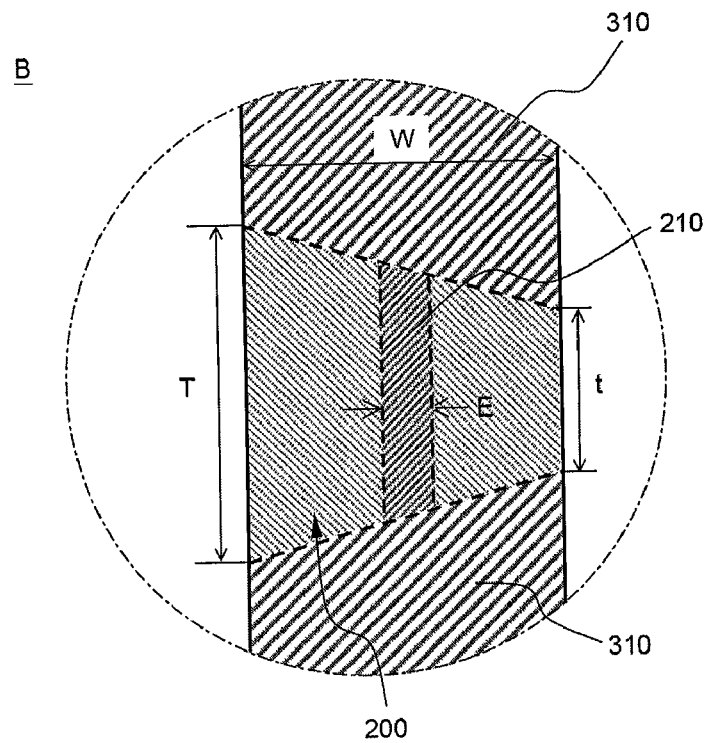
FIG. 3 is an enlarged horizontal sectional view typically illustrating B region of FIG. 2.

FIG. 2 is a see-through sectional view illustrating a secondary battery having an exhaust guide sealing portion according to an embodiment of the present invention, and FIG. 3 is an enlarged horizontal sectional view typically illustrating B region of FIG. 2.

Referring to these drawings, the secondary battery 100 includes an electrode assembly 320, a battery case for receiving the electrode assembly 320, and two electrode leads 420 and 421 electrically connected to electrode tabs of the electrode assembly 320.

The two electrode leads 420 and 421 are electrically connected to the electrode tabs (not shown), extending from corresponding electrode plates of the electrode assembly 320, by welding. The two electrode leads 420 and 421 are partially exposed to the outside of the battery case 300. To upper and lower surfaces of the electrode leads 420 and 421 are attached insulative films 430 for improving sealability between the battery case 300 and the electrode leads 420 and 421 and, at the same time, for securing electrical insulation between the battery case 300 and the electrode leads 420 and 421. The two electrode leads 420 and 421, constituting a cathode and an anode, may be arranged in opposite directions as shown in the drawings. Alternatively, the two electrode leads 420 and 421 may be arranged side by side in the same direction.

The battery case 300 is formed of an aluminum laminate sheet. The battery case 300 has a receiving part defined therein for receiving the electrode assembly 320. At a sealing portion 310 around the receiving part, an upper battery case and a lower battery case are coupled to each other by welding, with the result that the battery case 300 is formed generally in the shape of a pouch.

The sealing portion 310 has an exhaust guide sealing portion 200 which is formed in the shape of a trapezoid, i.e., in a structure in which the width of the exhaust guide sealing portion 200 decreases from the inside of the sealing portion 310 toward the outside of the sealing portion 310. When gas is generated in the battery, the battery case 300 swells the most greatly at the middle region M, with the result that a deformation force is the greatest at opposite-side sealing portions 310 located on the minor axis S of the battery case 300. Consequently, the exhaust guide sealing portion 200 is formed at the middle region of each of the opposite-side sealing portions 310 located on the minor axis S of the battery case 300 on the basis of the middle M of the battery case 300. As a result, the exhaust guide sealing portion 200 is first ruptured due to internal pressure created by the internal gas of the battery, with the result that the sealability of the battery is released, and therefore, the internal gas is exhausted out of the battery cell through the ruptured exhaust guide sealing portion 200.

The exhaust guide sealing portion 200 has a lower-end (inside) width T equivalent to approximately 10% of a major-axis length L of the battery case 300. The exhaust guide sealing portion 200 has an upper-end (outside) width t equivalent to approximately 40% of the lower-end (inside) width T.

At the middle of the exhaust guide sealing portion 200 is formed a bridge sealing portion 210 extending in parallel to the electrode assembly (not shown) for interconnecting opposite sides of the sealing portion 310 with a width E.

The bridge sealing portion 210 may exhibit a sealing force greater than that of the exhaust guide sealing portion 200 and equal to, less than, or greater than that of the sealing portion 310.

The bridge sealing portion 210 effectively increases the sealing force of the sealing portion 310, which may be weakened by the formation of the exhaust guide sealing portion 200. Since the bridge sealing portion 210 is ruptured only by gas pressure at which the exhaust of gas is required, it is possible to reliably secure the operation of the battery.

The width E of the bridge sealing portion 210 is equivalent to approximately 25% of the width W of the sealing portion 310.

In the drawing, meanwhile, the electrode leads 420 and 421 protrude outward from opposite-side sealing portions 310 located on the major axis L on the basis of the middle M of the battery case 300. That is, it is required for the regions where the electrode leads 420 and 421 are located to maintain high sealability and insulation, and therefore, it is preferred to form the bridge sealing portion 210 at a region different from the regions where the electrode leads 420 and 421 are located.

Figure 4:
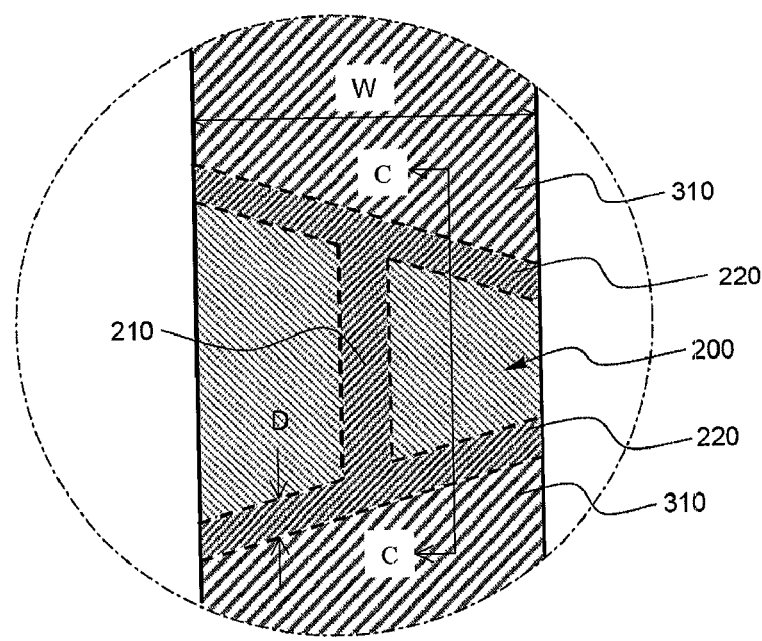
FIG. 4 is a horizontal sectional view typically illustrating an exhaust guide sealing portion according to another embodiment of the present invention.

FIG. 4 is a horizontal sectional view typically illustrating an exhaust guide sealing portion according to another embodiment of the present invention.

Referring to FIG. 4, an interface sealing portion 220 is formed at the interface between the bridge sealing portion 210 and the sealing portion 310. The interface sealing portion 220 exhibits a sealing force greater than that of the sealing portion 310. According to circumstances, as shown in FIG. 4, the sealing force of the interface sealing portion 220 may be equal to that of the bridge sealing portion 210.

The interface sealing portion 220 prevents a possibility that the sealing force of the region around the interface sealing portion 220 will weaken due to the formation of the exhaust guide sealing portion 200. Also, when high-pressure gas is generated in the battery, the interface sealing portion 220 prevents the deformation of the sealing portion 310 adjacent to the exhaust guide sealing portion 200 and the release of the sealing force, during the exhaust of the gas. Consequently, it is possible for the interface sealing portion 220 to guide the exhaust of the gas through the exhaust guide sealing portion 200 with higher reliability.

The interface sealing portion 220 has a width D equivalent to approximately 15% of the width W of the sealing portion 310.

Figure 5:
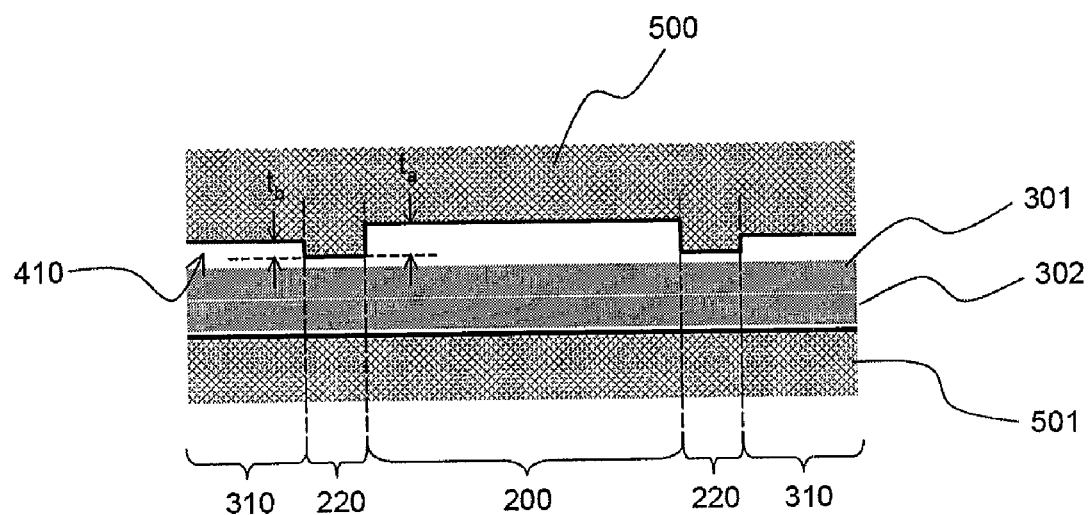
FIG. 5 is a vertical sectional view typically illustrating heating jigs and a battery case, corresponding to C-C region, to form the exhaust guide sealing portion of FIG. 4.

FIG. 5 is a vertical sectional view typically illustrating heating jigs and a battery case, corresponding to C-C region, to form the exhaust guide sealing portion of FIG. 4.

Referring to FIG. 5, an upper sheet 301 and a lower sheet 302 of the battery case are heated and pressurized by a pair of heating jigs 500 and 501 such that the upper sheet 301 and the lower sheet 302 are thermally welded to each other.

At the surface of the upper heating jig 500 is formed an engraved structure 510 corresponding to the sealing portion 310, the exhaust guide sealing portion 200, and the interface sealing portion 220. The engraved structure 510 may be formed at the surface of the lower heating jig 501. Alternatively, the engraved structure 510 may be formed not only at the surface of the upper heating jig 500 but also at the surface of the lower heating jig 501.

The engraved depth of the engraved structure 510 is in inverse proportion to the sealing force of the sealing portion. That is, on the basis of the depth of the region corresponding to the interface sealing portion 220, the depth $t_a$ corresponding to the exhaust guide sealing portion 200 is the greatest, and the depth $t_b$ corresponding to the sealing portion 310 is not greater than the depth $t_a$ corresponding to the exhaust guide sealing portion 200. During thermal welding, therefore, the least pressure is applied to the exhaust guide sealing portion 200, with the result that the sealing force of the exhaust guide sealing portion 200 is relatively low, whereas the greatest pressure is applied to the interface sealing portion 220, with the result that the sealing force of the interface sealing portion 220 is relatively high.

Consequently, it is possible to easily manufacture the structure of FIG. 4 using the upper heating jig 500 having the engraved structure 510.

Hereinafter, an example of the present invention will be described in more detail. It should be noted, however, that the scope of the present invention is not limited by the illustrated example.

EXAMPLE 1

A cathode was manufactured by coating slurry including lithium cobalt oxide, PVdF, and a conducting agent mixed according to a generally known composition on an aluminum current collector. An anode was manufactured by coating slurry including graphite, PVdF, and a conducting agent mixed according to a generally known composition on a copper current collector.

Between the cathode and the anode was disposed a separator which had been cut into a size somewhat greater than that of the cathode and the anode to manufacture an electrode assembly. The electrode assembly was mounted between an upper case and a lower case, each having a receiving part, of a pouch-shaped battery case formed of a laminate sheet.

The laminate sheet was configured in a structure including an inside resin layer made of cast polypropylene (cPP), an insulative aluminum metal layer, and an outside resin layer made of polyethylene terephthalate (PET).

Sealing portions formed around the receiving parts of the upper case and the lower case were placed on the heating jigs of FIG. 5, and were coupled to each other by thermal welding. An exhaust guide sealing portion was formed at the sealing portions such that the exhaust guide sealing portion has a relatively small upper-end (outside) width equivalent to 40% of a relatively large lower-end (inside) width of the exhaust guide sealing portion. A bridge sealing portion was formed such that the bridge sealing portion had a width equivalent to 25% of that of the remaining sealing portion. An interface sealing portion was formed such that the interface sealing portion had a width equivalent to 15% of that of the remaining sealing portion. Thermal welding was carried out such that the exhaust guide sealing portion had a sealing force equivalent to approximately 60% of that of the remaining sealing portion, and the bridge sealing portion and the interface sealing portion had a sealing force equivalent to 120% of that of the remaining sealing portion.

COMPARATIVE EXAMPLE 1

A secondary battery was manufactured in the same manner as Example 1 except that no exhaust guide sealing portion was formed at the secondary battery.

COMPARATIVE EXAMPLE 2

A secondary battery was manufactured in the same manner as Example 1 except that neither a bridge sealing portion nor an interface sealing portion was formed at the secondary battery.

EXPERIMENTAL EXAMPLE 1

200-cycle charge and discharge were carried out on 30 batteries manufactured according to Example 1 and Comparative examples 1 and 2 on conditions of 4.3 V charge and 3.0 V discharge to confirm whether gas was exhausted from the batteries or not.

Also, the batteries were placed in a chamber having an internal temperature of approximately 90 degrees, such that the batteries swelled, to confirm whether the batteries caught fire or exploded, the exhaust direction of internal gas, and battery swelling deviation during the exhaust of gas. The exhaust direction was decided by the number of sealing portions ruptured when the internal gas was exhausted. That is, the exhaust direction was set to be 1 when the sealing portion located at the same position of all the batteries was ruptured. When the sealing portions located at the different positions of some batteries were ruptured, the number of the ruptured sealing portions was added. Also, the battery swelling deviation during the exhaust of gas was converted into a percentage of the thickness of the battery exhibiting the minimum swelling degree during the exhaust of gas to the thickness of the battery exhibiting the maximum swelling degree during the exhaust of gas.

TABLE 1

| | Number of batteries from which gas was exhausted after 200 cycles | Number of batteries which caught fire or exploded | Exhaust direction of internal gas | Battery swelling deviation during exhaust of gas |
|---|---|---|---|---|
| Example 1 | 0 | 0 | 1 | 8 |
| Comparative example 1 | 0 | 7 | 8 | 32 |
| Comparative example 2 | 8 | 0 | 1 | 13 |

It can be seen from Table 1 that gas was not exhausted from all the batteries of Example 1 in a normal operating condition, and, even when the batteries swelled in a high temperature condition, the batteries did not catch fire or explode by the effective exhaust of internal gas from the batteries. Also, the internal gas of the batteries was exhausted in one direction or in two directions.

On the other hand, it was confirmed that a great number of the batteries of Comparative example 1 caught fire or exploded. Also, it was confirmed that the regions ruptured during the exhaust of the internal gas changed.

It is also confirmed that, although the batteries of Comparative example 2 did not catch fire or explode by the effective exhaust of internal gas from the batteries swelled in a high temperature condition, gas was exhausted from a great number of the batteries in a normal operating condition.

INDUSTRIAL APPLICABILITY

As apparent from the above description, the secondary battery according to the present invention is capable of exhibiting a high sealing force in a normal operating condition, and first releasing a sealing force of the exhaust guide sealing portion, when high-pressure gas is generated in the battery cell to selectively exhaust the high-pressure gas through a desired region. Consequently, the present invention has the effect of preventing a possibility that the battery will catch fire or explode, thereby considerably improving the safety of the battery and solving problems caused by indiscreet exhaust of noxious gas. Furthermore, the exhaust guide sealing portion is easily manufactured using predetermined heating jigs during the manufacture of the battery, thereby not causing the increase in manufacturing costs of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A plate-shaped secondary battery constructed in a structure in which an electrode assembly of a cathode/separator/anode structure is mounted in a battery case, and the battery case is sealed by thermal welding, wherein the battery case is provided at a sealing portion around an electrode assembly receiving part thereof with an exhaust guide sealing portion configured in a structure in which a width of the exhaust guide sealing portion decreases from an inside of the sealing portion toward an outside of the sealing portion such that a sealing force of the exhaust guide sealing portion is first released, when high-pressure gas is generated in a battery cell, and therefore, the high-pressure gas is exhausted outside, the exhaust guide sealing portion being thermally welded with a sealing force less than that of a sealing portion located at a remaining region ('a remaining sealing portion'), the battery case is further provided at a middle of the exhaust guide sealing portion with a bridge sealing portion extending in parallel to the electrode assembly for interconnecting opposite sides of the remaining sealing portion with a predetermined width, the bridge sealing portion being thermally welded with a sealing force greater than that of the exhaust guide sealing portion;

the exhaust guide sealing portion has a lower-end (inside) width equivalent to 5 to 30% of a major-axis length of the battery case; and the bridge sealing portion has a width equivalent to 10 to 60% of that of the remaining sealing portion.

2. The secondary battery according to claim 1, wherein the exhaust guide sealing portion has a relatively small upper-end (outside) width equivalent to 10 to 50% of a relatively large lower-end (inside) width thereof.

3. The secondary battery according to claim 1, wherein the exhaust guide sealing portion is formed in a horizontal plane shape of at least one selected from a group consisting of a semicircle, a triangle, and a trapezoid.

4. The secondary battery according to claim 3, wherein the exhaust guide sealing portion is formed in the trapezoidal shape.

5. The secondary battery according to claim 1, wherein the battery case is further provided at an interface between the exhaust guide sealing portion and the remaining sealing portion with an interface sealing portion thermally welded with a sealing force greater than that of the remaining sealing portion.

6. The secondary battery according to claim 5, wherein the interface sealing portion has a width equivalent to 2 to 20% of that of the remaining sealing portion.

7. The secondary battery according to claim 1, wherein the exhaust guide sealing portion is formed at a middle of one side or each side sealing portion located on a minor axis of the battery case on the basis of a middle of the battery case.

8. The secondary battery according to claim 1, wherein the battery case is formed of a laminate sheet including a resin layer and a metal layer.

9. The secondary battery according to claim 8, wherein the sheet is an aluminum laminate sheet.

10. The secondary battery according to claim 1, wherein the electrode assembly is constructed in a folding, stacking, or stacking/folding type structure.

11. The secondary battery according to claim 1, wherein the battery is a lithium ion polymer battery.

12. A middle- or large-sized battery module comprising the secondary battery according to claim 1, as a unit cell.

13. A method of manufacturing the secondary battery according to claim 1, the method comprising:

mounting the electrode assembly in the receiving part of the battery case; and thermally welding the sealing portion at the outer circumference of the battery case on a heating jig formed in an engraved shape corresponding to the exhaust guide sealing portion, the bridge sealing portion, and/or the interface sealing portion and having a depth inversely proportional to sealing forces of the sealing portions.

* * * * *